Feb. 20, 1968     L. VONDRA     3,369,686
LOADER MECHANISM
Filed April 1, 1966     2 Sheets-Sheet 1
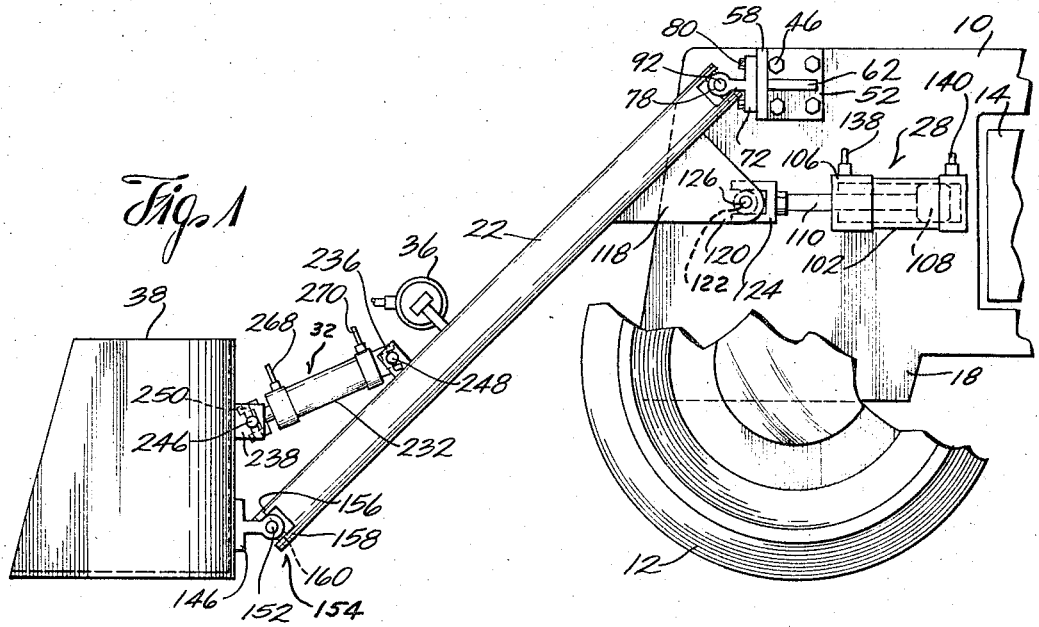
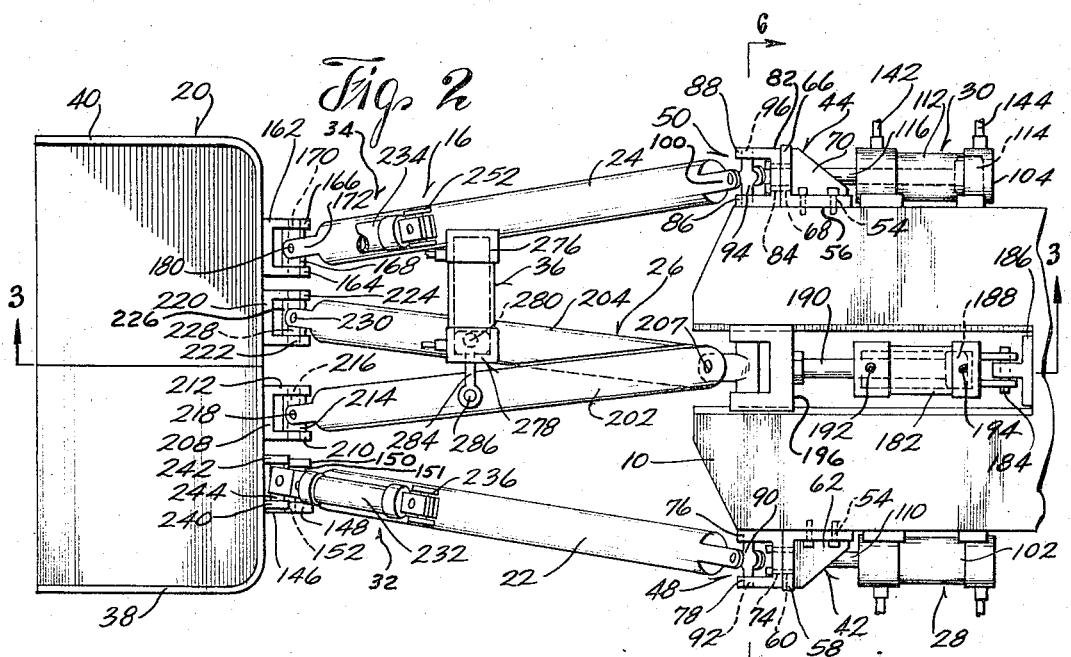
Inventor
Lubomir Vondra

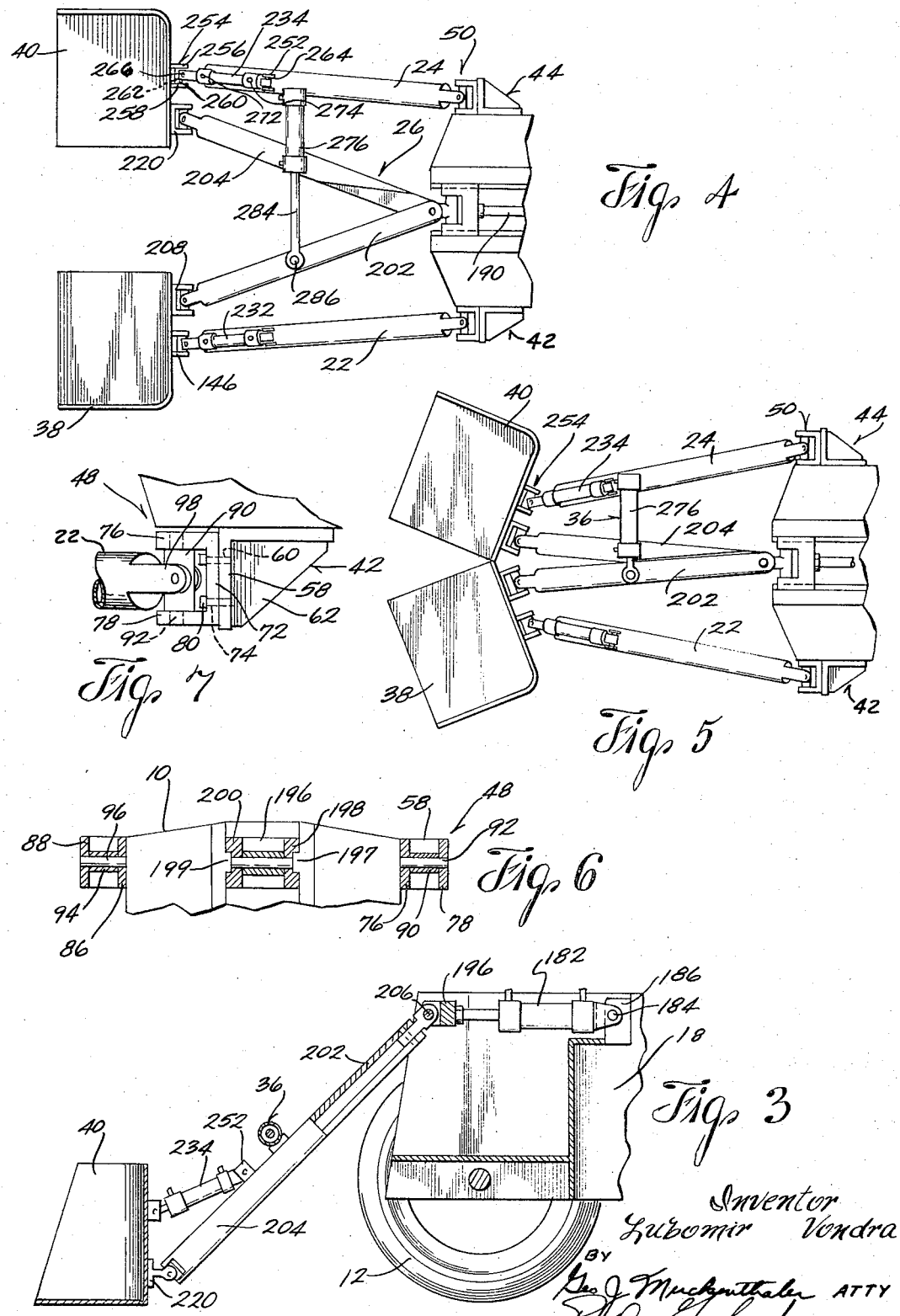

United States Patent Office 3,369,686
Patented Feb. 20, 1968

3,369,686
LOADER MECHANISM
Lubomir Vondra, Kansasville, Wis., assignor to J. I. Case Company, Racine, Wis., a corporation of Wisconsin
Filed Apr. 1, 1966, Ser. No. 539,442
14 Claims. (Cl. 214—768)

ABSTRACT OF THE DISCLOSURE

A material moving mechanism having a segmented bucket pivotally carried on a tractor and hydraulic control means for operating the bucket. A multi-purpose bucket universally connected with and supported from the tractor, the bucket including cooperating portions which can be positioned at various attitudes for moving material.

---

This invention relates to loading apparatus and mechanism for manipulating the apparatus, and more particularly to a loader which includes scoops or buckets arranged to operate in a side-to-side relationship.

There are numerous types of loaders used in the agricultural and industrial fields, the most common loader having a bucket with bottom, rear, and side portions, the bottom portion being formed to cut and scoop the material, and of course the side and rear portions formed to contain the material. Another common loading or excavating apparatus used is the clam-shell type for dredging and trenching operations, or for moving bulk material. Backhoes are also commonly used for trenching operation however, many of these and other similar machines can work only in the direction of travel or in a limited path, as the supports normally are pivoted in one plane. While these various devices have been highly successful, they are adaptable for a limited number of uses and operations.

The present invention is a novel apparatus for performing many operations, such as loading, shoveling, scraping, scooping, back-filling, and lifting; and the main object of the invention is to provide a multipurpose loading apparatus mounted on and carried by a vehicle.

Another object is to provide an apparatus which has side and center supporting members and controls for the cooperating loading buckets.

A further object is to provide an apparatus which has loading scoops or shovels positioned for side-to-side movement.

Another object is to provide an apparatus wherein the shovels or buckets can be raised and lowered, extended and retracted in a fore-and-aft direction, and also extended and retracted in a side-to-side direction.

A still further object is to provide universal type connections which allow for an infinite number of positions of the cooperating buckets.

Additional objects and advantages will become apparent from a reading of the following specification and the annexed drawings, in which:

FIGURE 1 is a side elevational view of the loading apparatus mounted on a vehicle;

FIG. 2 is a plan view of the same with the buckets in the closed position;

FIG. 3 is an elevational view taken on the line 3—3 of FIG. 2;

FIG. 4 is a plan view showing the cooperating buckets in an open position;

FIG. 5 is a plan view showing the buckets in another open position;

FIG. 6 is a view taken on the line 6—6 of FIG. 2; and

FIG. 7 is an enlarged view of a typical universal connection used in supporting the loading apparatus.

As seen in FIGS. 1 and 2, a tractor 10, having traction wheels 12 and an engine 14, carries the loading apparatus, generally designated as 16. Tractor 10 has an operator's station, steering wheel and a seat, these being conventional items and not shown as they form no part of the present invention. The tractor, of course, has a frame 18 to support the various parts and to provide a strong and rugged means for carrying the loading apparatus.

The invention, as practiced, includes generally a loader unit 20, its supporting members, these being side members 22 and 24, a centrally disposed member 26, and the hydraulic motors 28, 30, 32, 34 and 36. Loader unit 20 has a pair of buckets or shovels 38 and 40 supported and adapted to be swung in an up-and-down and a side-to-side relationship by reason of the actuation of the hydraulic cylinders. The bucket supporting members are connected by means of universal joints so that buckets 38 and 40 can be moved together as a unit 20 or they can be moved individually. In this respect the individual buckets can be compared to a pair of large human hands which can be moved in an infinite number of positions. The action of the buckets, due to the structure of the center supporting means 26, is also similar to the claws of a lobster in the many ways that the buckets can be positioned and moved.

Referring again to FIGS. 1 and 2, tractor 10 has brackets 42 and 44 mounted on the sides thereof by means of bolts 46. Side mounts or brackets 42 and 44 are of heavy construction and are disposed angularly outward from the tractor to form a means for supporting universal connections 48 and 50, these being connection 48 on the left side of the tractor and connection 50 on the right side facing in the direction of travel. Bracket 42 includes a generally square portion 52 having bores 54 through which bolts 46 are inserted for fastening the bracket to the tractor. Bracket 44 also has a generally square portion 56, similarly positioned as portion 52, with bores 54 through which bolts 46 are inserted. Bracket 42 also has a generally rectangular portion 58 with bores 60, at right angles to and secured to portion 52, and an angular shaped portion 62 fixed to and disposed between portions 52 and 56 as seen in FIG. 1. Bracket 44 has a similar rectangular portion 66 with bores 68, and an angular portion 70 corresponding to the portions of bracket 42.

Connection 48 includes a flat portion 72, more clearly shown in FIG. 7, having bores 74 aligning with bores 60 in portion 58, and an inner ear 76 and an outer ear 78. Bolts 80 are inserted in bores 74 and 60 to secure the connection 48 to bracket 42. Bracket 44 also has a flat portion 82 similarly disposed as portion 72 with bores 84 aligning with bores 68 in portion 66, and an inner ear 86 and an outer ear 88. Ears 76 and 78 are disposed so as to receive a spacer 90 held in place by a pin 92, the spacer being free to pivot between ears 76 and 78. Ears 86 and 88 are also disposed to receive a spacer 94 held in place by a pin 96. Spacer 90 has a portion 98 normal to pin 92 for connecting to member 22 and spacer 94 has a portion 100 normal to pin 96 for connecting to member 24.

The side support means 22 and 24 are long boom-type members extending generally in the direction of travel of tractor 10. These are the support arms for raising and lowering the buckets 38 and 40. The means for raising and lowering these support arms includes hydraulic cylinders 102 and 104, cylinder 102 having a body 106, a piston 108 and a rod 110, and cylinder 104 having a body 112, a piston 114, and a rod 116. The hydraulic cylinders are of conventional construction and it is believed not necessary to further describe them except as they relate to the invention.

Cylinder body 106 is connected securely to the tractor and the piston 108 and rod 110 are movable freely within the body. Lift member 22 has an arm 118 positioned near the rearward end thereof which arm extends downwardly and rearwardly. Arm 118 has a bifurcated portion 120 which has a bore 122, portion 120 being positioned to universally connect with piston rod 110, by means of an eared element 124 and a pin 126. Cylinder 104 is of similar construction as cylinder 102 and lift member 24 is similar to member 22 in that member 24 has an arm 128, a bifurcated portion 130, a bore 132, an eared element 134 and a pin 136, these not being shown as they are identical to the corresponding parts shown on the left side.

Hydraulic lines 138 and 140 are connected to cylinder 102 and lines 142 and 144 are connected to cylinder 104. These lines are connected to a control valve, which in turn, is connected to a hydraulic pump driven by the engine. The hydraulic control system may be any conventional type and need not be further described.

Bucket 38 has secured thereto, as by welding, a bifurcated bracket 146 which has ears 148 and 150. A spacer 151 is disposed between ears 148 and 150 and held in place by a pin 152. Lift arm 22 has a bifurcated portion 154 with ears 156 and 158 adapted to fit over spacer 151 and held in place by a pin 160. In like manner, bucket 40 has a bracket 162 with ears 164 and 166, a spacer 168 and a pin 170 and lift arm 24 has a portion 172 with ears 174 and 176, not shown, a spacer 178 and a pin 180.

It is thus seen that herein described are supporting means for the buckets 38 and 40 which means are universally connected to the tractor and to the buckets and also a means for raising and lowering the buckets wherein hydraulic fluid is introduced into the cylinders thru the lines, and the piston rods of the cylinders are universally connected to the supporting means.

The center support or position control means 26 includes a hydraulic cylinder 182 pivotally connected by a pin 184 to a bracket 186 on the tractor, as seen in FIGS. 2 and 3, cylinder 182 having a piston 188 and a piston rod 190. Cylinder 182 is centrally located on the tractor and lines 192 and 194 connect the cylinder to the hydraulic control system. Rod 190 has a bifurcated portion 196 with ears 198 and 200.

As seen in FIG. 6, the center support means 26 is connected to portion 196, the tractor having ribs 197 and 199 on which slidably move the eared portions 198 and 200. As the cylinder piston 188 and rod 190 are moved, portion 196 slides on ribs 197 and 199. The center control means 26 also includes a bifurcated boom member comprising arms 202 and 204.

Arms 202 and 204 are connected to the bifurcated portion 196 and held in place, but free to pivot in a vertical plane by means of a pin 206 and also pivotable in a horizontal plane on a pin 207. The arm 202 is universally connected to bucket 38 in that a bifurcated element 208 is secured to the bucket, element 208 having ears 210 and 212, a spacer 214 and a pin 216. Arm 202 is then connected to element 208 by means of a pivot pin 218. Arm 204 is similarly connected to bucket 40, the bucket having an element 220 fixed thereto with ears 222 and 224, a spacer 226 and a pin 228. Arm 204 is then connected to element 220 by means of a pivot pin 230.

It is thus far seen that the side support members 22 and 24 and the center control member 26 universally connect the buckets 38 and 40 to the tractor and the buckets can be moved in many positions through actuation of the hydraulic control system and the hydraulic cylinders.

A means for tilting the buckets 38 and 40 is provided, this means being hydraulic cylinders 232 and 234. Lift arm 22 has a bifurcated bracket 236 fixed thereto at a position near where the arm connects to the bucket 38. Bucket 38 has a bifurcated element 238 fixed thereto with ears 240 and 242, and a spacer 244 between the ears held by a pin 246. Cylinder 232 is universally connected to bracket 236 by means of a pin 248 and also universally connected to element 238 by a pin 250. Cylinder 232 is positioned such that the centerline thereof is on the same centerline as member 22. Arm 24 similarly has a bifurcated bracket 252 fixed thereto near where the arm connects to the bucket 40. Similarly, bucket 40 has an element 254 fixed thereto with ears 256 and 258, a spacer 260 and a pin 262, and cylinder 234 is universally connected to bracket 252 by a pin 264 and to element 254 by a pin 266. Hydraulic lines 268 and 270 are connected to cylinder 232 and to the control system and lines 272 and 274 are connected to cylinder 234 and to the control system.

A means for moving buckets 38 and 40 in a side-to-side relationship is provided by a hydraulic cylinder 276 cooperating with cylinder 182 connected to the bifurcated member 26. Cylinder 276 is connected as by a gimbal 278 to arm 204, the gimbal being free to pivot on a pin 280. Cylinder 276 also includes a piston 282 and a rod 284, the rod being pivotally connected to arm 204 by means of a pin 286.

FIG. 4 shows a position of the buckets extended which is attainable by reason of the universal joints or connections with the tractor and the buckets and FIG. 5 is another position of the cooperating buckets. It is thus seen that herein shown and described is a versatile construction implement which, with the buckets in the closed position, can be used as a front end loader, a shovel, a scraper, a scoop or a lifter for moving materials. As a loader, the extension and retraction cylinder 182 is in a closed or shortened position so as to retract the center support member towards the tractor, and the clamp cylinder 276 is also in a closed position. When the clamp cylinder is moved to the open position, the buckets are swung away from each other in a side-to-side relationship and in an arcuate plane with pin 207 as the pivot point. In this manner, each bucket is used as a scoop or shovel to move material which is to the side of the tractor in the case where material is in a heap wider than the extremities of the buckets in a closed position. When the extension cylinder rod 190 is moved to the open position, the adjacent or mating parts of the buckets are moved away from the centerline of the tractor and each bucket then is swung to a position where the forward portion of each bucket is farther from the tractor than the side portions as seen in FIG. 5. This position of the buckets is valuable for wide angle scooping or shoveling and can be used to advantage in back-filling operations, in obstructed areas, or in trenches where the tractor is driven along one side of the trench. When it is necessary to reach material to one side of the tractor, for instance in a restricted area, the clamp cylinder rod 284 can be extended and the buckets are disposed as shown in FIG. 4.

It can be appreciated that herein disclosed is a loading or shoveling apparatus for attachment to a tractor which allows for adjusting of and moving the buckets or shovels in a multitude of positions for many applications.

While only one embodiment has been disclosed, it will be apparent that alterations and variations of the apparatus and the connections may be made. The hydraulic cylinders may be positioned in a different attitude or the universal connections may be varied from that shown. Other variations may occur to those skilled in the art, and it is to be understood that the invention is not limited by the specific embodiment described and illustrated, or in fact in any manner except as defined in the following claims.

What is claimed as new and desired to be secured by Letters Patent of the United States is:

1. A loading apparatus for use with a tractor having an engine, traction wheels, and a hydraulic control system including
    side support means on the tractor,
    means for raising and lowering said side support means,
    center support means on the tractor,
    means connected with said tractor and with said center support means for extending and retracting said center support means,
    cooperating buckets carried on said side and center support means, and means on said center support means for moving said buckets in a side-to-side relationship.

2. A loading apparatus in accordance with claim 1 including means for tilting said cooperating buckets.

3. A loading apparatus in accordance with claim 1 including universal connections on said side support means and on said center support means.

4. A loading apparatus in accordance with claim 2 including universal connections on said means for tilting said buckets.

5. A loading apparatus in accordance with claim 1 wherein said means for raising and lowering, said means for extending and retracting, and said means for moving said buckets are hydraulic cylinders actuated by said control system.

6. A loading apparatus in accordance with claim 2 wherein said cooperating buckets are universally connected to said side support means and to said center support means, and to said means for tilting said buckets.

7. A loading apparatus in accordance with claim 1 wherein the side support means includes side mount members on said tractor.

8. A loading apparatus in accordance with claim 1 wherein said center support means is a bifurcated member connected to said means for extending and retracting and connected to said cooperating buckets.

9. A loading apparatus in accordance with claim 8 wherein said bifurcated member swings in scissor-like movement by reason of actuation of said means for moving said buckets.

10. A loading apparatus in accordance with claim 5 wherein said hydraulic cylinder for moving said buckets in a side-to-side relationship is positioned transverse to the direction of travel of said tractor and substantially centered between the tractor and the buckets.

11. A loading apparatus in accordance with claim 1 wherein said side support means are lift arms universally connected to said tractor and to said cooperating buckets.

12. A loading apparatus in accordance with claim 5 wherein said means for raising and lowering are hydraulic cylinders connected to said tractor and to said side support means.

13. A loading apparatus in accordance with claim 1 wherein each of said cooperating buckets includes a bottom portion, a rear portion, and a side portion, the bottom and rear portions being adjacently disposed in one position of said buckets.

14. A loading apparatus in accordance with claim 5 wherein said means for moving said buckets is a hydraulic cylinder connected to said center support means in clamp-like relationship to swing said buckets in an opening and closing arcuate plane.

References Cited

UNITED STATES PATENTS

| | | | |
|---|---|---|---|
| 145,723 | 12/1873 | Collins | 37—183 |
| 3,116,845 | 1/1964 | Holopainen | 214—145 |

FOREIGN PATENTS

| | | |
|---|---|---|
| 1,214,004 | 11/1959 | France. |

HUGO O. SCHULZ, *Primary Examiner.*